US007944808B2

(12) United States Patent
Yoon et al.

(10) Patent No.: US 7,944,808 B2
(45) Date of Patent: May 17, 2011

(54) OFDM SYMBOL DESIGN FOR DIFFERENT CHANNEL CONDITIONS AND FOR BACKWARD COMPATIBILITY WITH 1XEV-DO AND NXEV-DO

(75) Inventors: Young C. Yoon, San Diego, CA (US);
Li-Hsiang Sun, San Diego, CA (US);
Sang G. Kim, San Diego, CA (US);
Hobin Kim, San Diego, CA (US)

(73) Assignee: LG Electronics Inc., Seoul (KR)

( * ) Notice: Subject to any disclaimer, the term of this patent is extended or adjusted under 35 U.S.C. 154(b) by 351 days.

(21) Appl. No.: 11/690,724

(22) Filed: Mar. 23, 2007

(65) Prior Publication Data
US 2007/0223366 A1    Sep. 27, 2007

Related U.S. Application Data

(60) Provisional application No. 60/785,437, filed on Mar. 24, 2006, provisional application No. 60/786,921, filed on Mar. 28, 2006.

(51) Int. Cl.
*H04J 11/00* (2006.01)
(52) U.S. Cl. ............... 370/208; 370/203; 370/210
(58) Field of Classification Search .......... 370/203, 370/208, 210; 375/260
See application file for complete search history.

(56) References Cited

U.S. PATENT DOCUMENTS

| | | | |
|---|---|---|---|
| 6,115,354 A | | 9/2000 | Weck |
| 2004/0081131 A1* | | 4/2004 | Walton et al. ............. 370/344 |
| 2004/0264431 A1* | | 12/2004 | Rhodes ............. 370/343 |
| 2005/0030886 A1* | | 2/2005 | Wu et al. ............. 370/206 |
| 2005/0041574 A1* | | 2/2005 | Wu et al. ............. 370/208 |
| 2005/0069022 A1* | | 3/2005 | Agrawal ............. 375/132 |
| 2006/0062318 A1* | | 3/2006 | Blasco Claret et al. ....... 375/260 |
| 2006/0239227 A1* | | 10/2006 | Han et al. ............. 370/331 |
| 2007/0066362 A1* | | 3/2007 | Ma et al. ............. 455/562.1 |
| 2007/0195690 A1* | | 8/2007 | Bhushan et al. ............. 370/208 |
| 2007/0195899 A1* | | 8/2007 | Bhushan et al. ............. 375/260 |

FOREIGN PATENT DOCUMENTS
KR    10-0560386    3/2006
WO    97/30531 A1    8/1997

* cited by examiner

*Primary Examiner* — Ricky Ngo
*Assistant Examiner* — Rasheed Gidado
(74) *Attorney, Agent, or Firm* — Lee, Hong, Degerman, Kang & Waimey

(57) ABSTRACT

A method for generating a transmission slot includes receiving a transmission slot that includes a plurality of data regions and a plurality of control regions, in which each of the data regions include digital spread spectrum data. The method further includes substituting each of the plurality of data regions with at least one OFDM symbol having variable duration, in which each of the at least one OFDM symbol has a cyclic prefix extension (CPE).

8 Claims, 14 Drawing Sheets

---

100

Receive a transmission slot including a plurality of data regions (each having digital spread spectrum data) and plurality of control regions

105

Substitute each of the plurality of data regions with at least one OFDM symbol having variable duration

| Preamble length (Chips) | Symbol length (Chips) | Symbol length (Chips) |
|---|---|---|
| 64 | 400 − 64 = 336 | 336 |
| 128 | 400 − 128 = 272 | 272 |
| 256 | 400 − 256 = 144 | 144 |
| 512 | 400 − 112 = 288 | 288 |
| 1024 | 400 − 224 = 176 | 176 |

Fig. 2

| OFDM Symbol Duration (Chips) | FFT (Chips) | CPE (Chips) | CPE Duration |
| --- | --- | --- | --- |
| 100 | 96 | 4 | 3.3E-06 |
| 100 | 90 | 10 | 8.1E-06 |
| 100 | 81 | 19 | 1.5E-05 |
| 100 | 80 | 20 | 1.6E-05 |
| 200 | 192 | 8 | 6.5E-06 |
| 200 | 180 | 20 | 1.6E-05 |
| 400 | 384 | 16 | 1.3E-05 |

Fig. 3

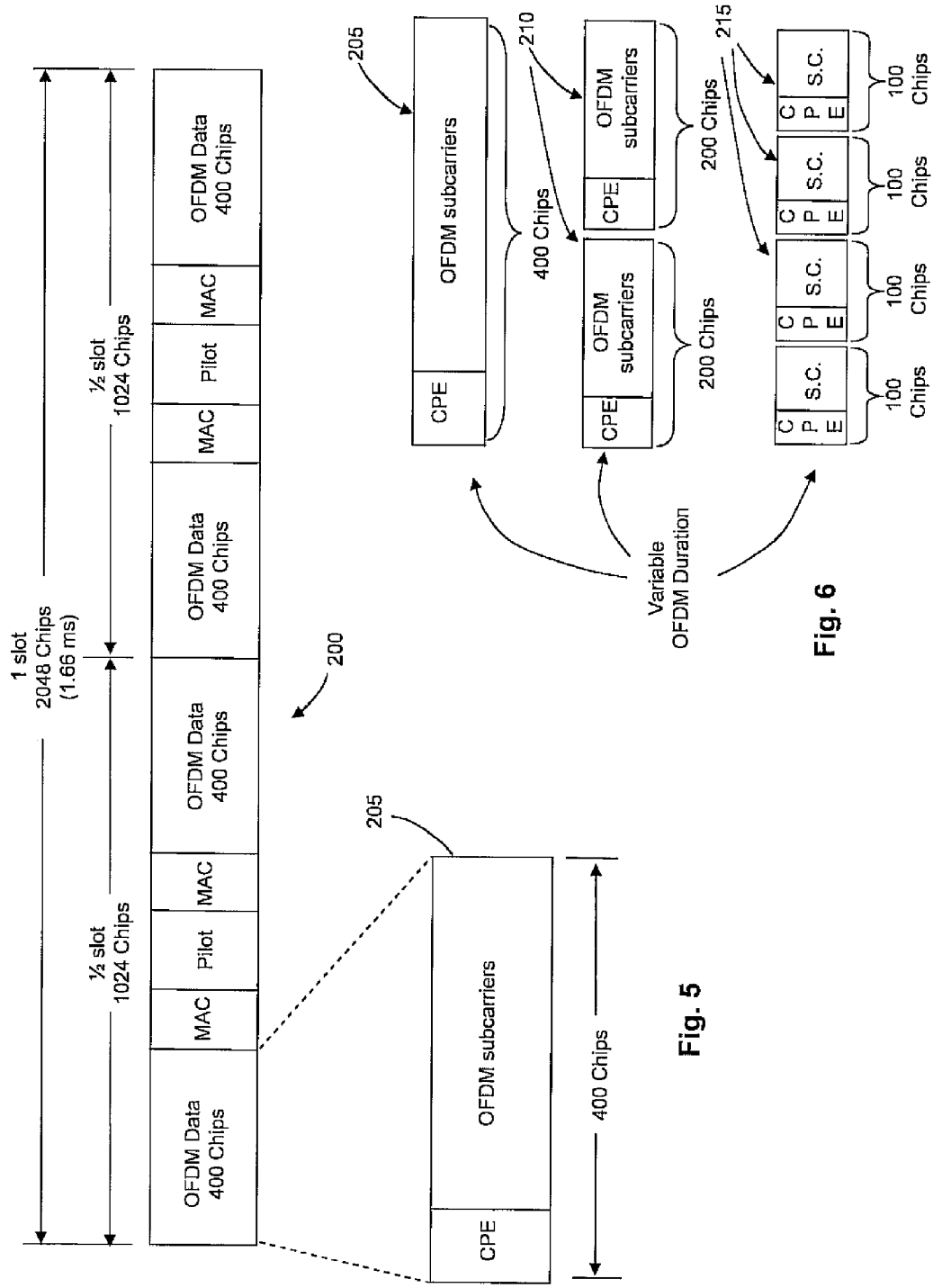

OFDM 100 chip symbol duration- CPE 4

| System BW (MHz) | 1.25 | 2.5 | 3.75 | 5 | 10 | 15 | 20 |
|---|---|---|---|---|---|---|---|
| Sampling Freq (MHz) | 1.2288 | 2.4576 | 3.6864 | 4.9152 | 9.8304 | 14.7456 | 19.6608 |
| FFT size | 96 | 192 | 288 | 384 | 768 | 1152 | 1536 |
| Symbol Duration (micro sec) | 81.38 | 81.38 | 81.38 | 81.38 | 81.38 | 81.38 | 81.38 |
| CPE sample size | 4 | 8 | 12 | 16 | 32 | 48 | 64 |
| CPE Duration (micro sec) | 3.26 | 3.26 | 3.26 | 3.26 | 3.26 | 3.26 | 3.26 |
| Useful Symbol Duration (micro sec) | 78.13 | 78.13 | 78.13 | 78.13 | 78.13 | 78.13 | 78.13 |
| Sub-carrier separation (kHz) | 12.80 | 12.80 | 12.80 | 12.80 | 12.80 | 12.80 | 12.80 |
| Number of subcarriers | 96 | 192 | 288 | 384 | 768 | 1152 | 1536 |

Fig. 7

OFDM 100 chip symbol duration- CPE 10

| System BW (MHz) | 1.25 | 2.5 | 3.75 | 5 | 10 | 15 | 20 |
|---|---|---|---|---|---|---|---|
| Sampling Freq (MHz) | 1.2288 | 2.4576 | 3.6864 | 4.9152 | 9.8304 | 14.7456 | 19.6608 |
| FFT size | 90 | 180 | 270 | 360 | 720 | 1080 | 1440 |
| Symbol Duration (micro sec) | 81.38 | 81.38 | 81.38 | 81.38 | 81.38 | 81.38 | 81.38 |
| CPE sample size | 10 | 20 | 30 | 40 | 80 | 120 | 160 |
| CPE Duration (micro sec) | 8.14 | 8.14 | 8.14 | 8.14 | 8.14 | 8.14 | 8.14 |
| Useful Symbol Duration (micro sec) | 73.24 | 73.24 | 73.24 | 73.24 | 73.24 | 73.24 | 73.24 |
| Sub-carrier separation (kHz) | 13.65 | 13.65 | 13.65 | 13.65 | 13.65 | 13.65 | 13.65 |
| Number of subcarriers | 90 | 180 | 270 | 360 | 720 | 1080 | 1440 |

Fig. 8

OFDM 100 chip symbol duration- CPE 19

| System BW (MHz) | 1.25 | 2.5 | 3.75 | 5 | 10 | 15 | 20 |
|---|---|---|---|---|---|---|---|
| Sampling Freq (MHz) | 1.2288 | 2.4576 | 3.6864 | 4.9152 | 9.8304 | 14.7456 | 19.6608 |
| FFT size | 81 | 162 | 243 | 324 | 648 | 972 | 1296 |
| Symbol Duration (micro sec) | 81.38 | 81.38 | 81.38 | 81.38 | 81.38 | 81.38 | 81.38 |
| CPE sample size | 19 | 38 | 57 | 76 | 152 | 228 | 304 |
| CPE Duration (micro sec) | 15.46 | 15.46 | 15.46 | 15.46 | 15.46 | 15.46 | 15.46 |
| Useful Symbol Duration (micro sec) | 65.92 | 65.92 | 65.92 | 65.92 | 65.92 | 65.92 | 65.92 |
| Sub-carrier separation (kHz) | 15.17 | 15.17 | 15.17 | 15.17 | 15.17 | 15.17 | 15.17 |
| Number of subcarriers | 81 | 162 | 243 | 324 | 648 | 972 | 1296 |

Fig. 9

OFDM 100 chip symbol duration- CPE 20

| | | | | | | | | |
|---|---|---|---|---|---|---|---|---|
| System BW (MHz) | 1.25 | 2.5 | 3.75 | 5 | 10 | 15 | 20 |
| Sampling Freq (MHz) | 1.2288 | 2.4576 | 3.6864 | 4.9152 | 9.8304 | 14.7456 | 19.6608 |
| FFT size | 80 | 160 | 240 | 320 | 640 | 960 | 1280 |
| Symbol Duration (micro sec) | 81.38 | 81.38 | 81.38 | 81.38 | 81.38 | 81.38 | 81.38 |
| CPE sample size | 20 | 40 | 60 | 80 | 160 | 240 | 320 |
| CPE Duration (micro sec) | 16.28 | 16.28 | 16.28 | 16.28 | 16.28 | 16.28 | 16.28 |
| Useful Symbol Duration (micro sec) | 65.10 | 65.10 | 65.10 | 65.10 | 65.10 | 65.10 | 65.10 |
| Sub-carrier separation (kHz) | 15.36 | 15.36 | 15.36 | 15.36 | 15.36 | 15.36 | 15.36 |
| Number of subcarriers | 80 | 160 | 240 | 320 | 640 | 960 | 1280 |

Fig. 10

OFDM 200 chip symbol duration- CPE 8

| | | | | | | | | |
|---|---|---|---|---|---|---|---|---|
| System BW (MHz) | 1.25 | 2.5 | 3.75 | 5 | 10 | 15 | 20 |
| Sampling Freq (MHz) | 1.2288 | 2.4576 | 3.6864 | 4.9152 | 9.8304 | 14.7456 | 19.6608 |
| FFT size | 192 | 384 | 576 | 768 | 1536 | 2304 | 3072 |
| Symbol Duration (micro sec) | 162.76 | 162.76 | 162.76 | 162.76 | 162.76 | 162.76 | 162.76 |
| CPE sample size | 8 | 16 | 24 | 32 | 64 | 96 | 128 |
| CPE Duration (micro sec) | 6.51 | 6.51 | 6.51 | 6.51 | 6.51 | 6.51 | 6.51 |
| Useful Symbol Duration (micro sec) | 156.25 | 156.25 | 156.25 | 156.25 | 156.25 | 156.25 | 156.25 |
| Sub-carrier separation (kHz) | 6.40 | 6.40 | 6.40 | 6.40 | 6.40 | 6.40 | 6.40 |
| Number of subcarriers | 192 | 384 | 576 | 768 | 1536 | 2304 | 3072 |

Fig. 11

OFDM 200 chip symbol duration- CPE 20

| System BW (MHz) | 1.25 | 2.5 | 3.75 | 5 | 10 | 15 | 20 |
|---|---|---|---|---|---|---|---|
| Sampling Freq (MHz) | 1.2288 | 2.4576 | 3.6864 | 4.9152 | 9.8304 | 14.7456 | 19.6608 |
| FFT size | 180 | 360 | 540 | 720 | 1440 | 2160 | 2880 |
| Symbol Duration (micro sec) | 162.76 | 162.76 | 162.76 | 162.76 | 162.76 | 162.76 | 162.76 |
| CPE sample size | 20 | 40 | 60 | 80 | 160 | 240 | 320 |
| CPE Duration (micro sec) | 16.28 | 16.28 | 16.28 | 16.28 | 16.28 | 16.28 | 16.28 |
| Useful Symbol Duration (micro sec) | 146.48 | 146.48 | 146.48 | 146.48 | 146.48 | 146.48 | 146.48 |
| Sub-carrier separation (kHz) | 6.83 | 6.83 | 6.83 | 6.83 | 6.83 | 6.83 | 6.83 |
| Number of subcarriers | 180 | 360 | 540 | 720 | 1440 | 2160 | 2880 |

Fig. 12

OFDM 400 chip symbol duration - CPE 16

| System BW (MHz) | 1.25 | 2.5 | 3.75 | 5 | 10 | 15 | 20 |
|---|---|---|---|---|---|---|---|
| Sampling Freq (MHz) | 1.2288 | 2.458 | 3.6864 | 4.915 | 9.8304 | 14.746 | 19.661 |
| FFT size | 384 | 768 | 1152 | 1536 | 3072 | 4608 | 6144 |
| Symbol Duration (micro sec) | 325.52 | 325.52 | 325.52 | 325.52 | 325.52 | 325.52 | 325.52 |
| CPE sample size | 16 | 32 | 48 | 64 | 128 | 192 | 256 |
| CPE Duration (micro sec) | 13.02 | 13.02 | 13.02 | 13.02 | 13.02 | 13.02 | 13.02 |
| Sub-carrier separation (kHz) | 3.2 | 3.2 | 3.2 | 3.2 | 3.2 | 3.2 | 3.2 |
| Number of subcarriers | 384 | 768 | 1152 | 1536 | 3072 | 4608 | 6144 |

Fig. 13

OFDM SYMBOL DESIGN FOR DIFFERENT CHANNEL CONDITIONS AND FOR BACKWARD COMPATIBILITY WITH 1XEV-DO AND NXEV-DO

CROSS-REFERENCE TO RELATED APPLICATIONS

Pursuant to 35 U.S.C. §119(e), this application claims benefit of priority from provisional patent applications Ser. No. 60/785,437, filed Mar. 24, 2006, and Ser. No. 60/786,921, filed Mar. 28, 2006, the contents of which are hereby incorporated by reference herein in their entirety.

BACKGROUND OF THE INVENTION

1. Field of the Invention

The present invention relates generally to mobile communications, and in particular to methods for generating a transmission slot having at least one orthogonal frequency-division multiplexing (OFDM) symbol having variable duration.

2. Discussion of the Related Art

Numerous access schemes exist to allow multiple users to share a communication medium. One such access scheme is known as code division multiple access (CDMA). In CDMA systems, multiple users share the same carrier frequency and may transmit simultaneously.

The current standard for CDMA systems is contained in specifications published by the Telecommunications Industry Association and Electronics Industry Association (TIA/EIA), and include IS-95A, IS-95B, and other CDMA-type protocols. New standards for wideband CDMA have been developed and offer significant performance improvements compared to the current CDMA standard. One such standard is known as cdma2000. cdma2000 is a wideband, spread-spectrum radio interface that uses CDMA technology to satisfy the needs of third generation wireless communication systems. Several enhancements of the cdma2000 standard have been developed to facilitate the gradual evolution of third generation wireless communication systems. The cdma2000 variant known as 1xEV-DO is being developed to provide high-speed packet data services as an overlay to existing circuit-switched networks.

OFDM is a technique that effectively partitions the overall system bandwidth into multiple orthogonal subbands. These subbands are also referred to as tones, carriers, subcarriers, bins, and frequency channels. Each subband is associated with a subcarrier that can be modulated with data. In each time interval that is dependent on the bandwidth of each subband, a modulation symbol may be transmitted on each of the N subbands. OFDM may be used to combat inter-symbol interference (ISI), which is a phenomenon whereby each symbol in a received signal acts as distortion to subsequent symbols in the received signal. ISI is caused by frequency selective fading in a multipath channel. To combat ISI, a portion of each OFDM symbol is repeated prior to transmission, as is known in the art.

Current standards typically utilize fixed-duration OFDM symbols in transmission slots communicated to mobile terminals, for example, operating within the coverage area of a communications network. Fixed-duration OFDM symbols are limiting to the extent that system transmissions cannot easily adapt to varying channel conditions experienced by the mobile terminals.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a method for generating a transmission slot includes receiving a transmission slot that includes a plurality of data regions and a plurality of control regions, in which each of the data regions include digital spread spectrum data. The method further includes substituting each of the plurality of data regions with at least one OFDM symbol having variable duration, in which each of the at least one OFDM symbol has a cyclic prefix extension (CPE).

In one aspect, the substituting includes determining a number of OFDM symbols per data region; assigning each of the OFDM symbols to a certain number of chips of the data regions; associating certain chips of the OFDM symbols to CPE; and associating certain chips of the CPE to a window.

In another aspect, the method further includes modifying duration of the OFDM symbol based on relative speed between a mobile terminal receiving the transmission slot and a network entity communicating the transmission slot.

In yet another aspect, the method further includes modifying length of the CPE based on channel delay spread experienced by a mobile terminal receiving the transmission slot.

In still yet another aspect, the method further includes substituting a plurality of the data regions with OFDM symbols which differ in duration.

According to one feature, the method further includes modifying the duration of the OFDM symbols responsive to a request.

According to another feature, the method further includes transmitting the transmission slot in a forward link communication to a mobile terminal operating within a communication network.

In accordance with another embodiment, a mobile terminal includes an input component permitting user input, a display, and a receiver configured to receive a forward link transmission slot having a plurality of data regions and a plurality of control regions, in which each of the data regions include at least one OFDM symbol having variable duration, in which each OFDM symbol has CPE.

In accordance with yet another embodiment, a method for generating a transmission slot includes receiving a transmission slot that includes a plurality of data regions and a plurality of control regions, in which each of the data regions include digital spread spectrum data. The method further includes substituting, in alternating slots of the plurality of transmission slots, each of the plurality of data regions with at least one OFDM symbol having variable duration, in which each OFDM symbol has CPE.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments. In the drawings:

FIG. 2 is a table showing various preamble lengths along with corresponding symbol lengths;

FIG. 3 is a table which includes various OFDM designs based on a basic 1.2288 Mcps clock rate;

FIG. 5 depicts a typical transmission slot in accordance with an embodiment of the present invention;

FIG. 6 depicts various OFDM symbol designs which may be implemented in a transmission slot, such as the slot depicted in FIG. 5;

FIGS. 7-13 are tables which depict various OFDM symbol designs in accordance with embodiments of the present invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or similar parts.

Figure 1:
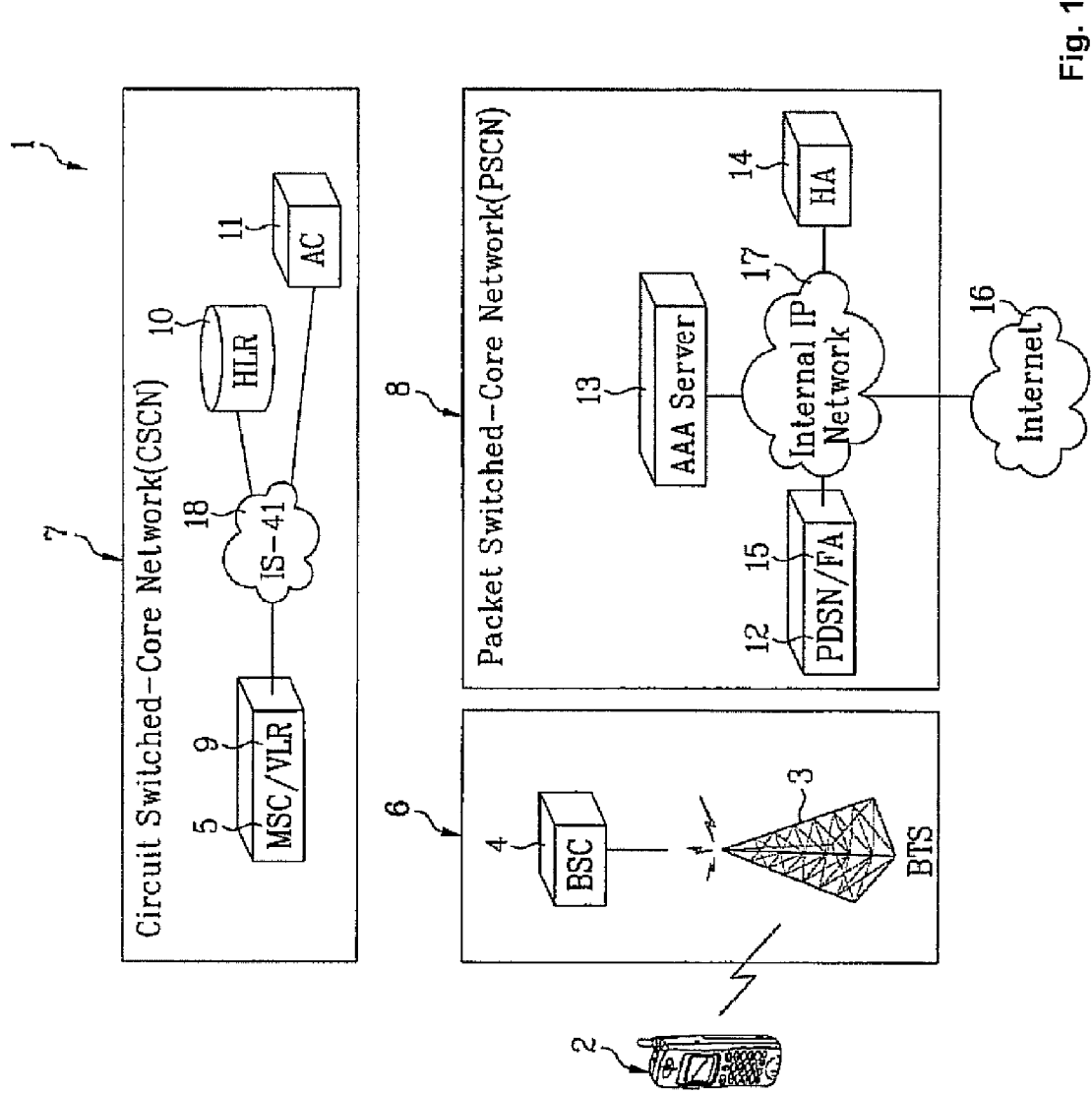
FIG. 1 depicts a wireless communication network in accordance with an embodiment of the present invention.

Referring to FIG. 1, a wireless communication network 1 is illustrated. A subscriber uses mobile terminal 2 to access network services. Mobile terminal 2 may be a portable communications unit, such as a hand-held cellular phone, a communication unit installed in a vehicle, or a fixed-location communications unit.

Electromagnetic waves from mobile terminal 2 are transmitted along a reverse link to base transceiver system (BTS) 3, which is also known as node B. The BTS includes radio devices such as antennas and equipment for transmitting radio waves. Access network 6 includes a base station controller (BSC) 4 which receives transmissions from one or more BTSs. The BSC provides control and management of the radio transmissions from each BTS by exchanging messages with the BTS and mobile switching center (MSC) 5 or internal IP network 17.

Access network 6 exchanges messages with, and transmits data to, a circuit switched core network (CSCN) 7 and packet switched core network (PSCN) 8. The CSCN provides traditional voice communications, and the PSCN provides Internet applications and multimedia services.

MSC 5 provides switching for traditional voice communications to and from mobile terminal 2, and may store information to support these capabilities. The MSC may be connected to one or more access networks 6, as well as other public networks such as, for example, a public switched telephone network (PSTN) (not shown) or an integrated services digital network (ISDN) (not shown). Visitor location register (VLR) 9 is used to retrieve information for handling voice communications to or from a visiting subscriber. The VLR may be configured within MSC 5, and may serve more than one MSC.

A user identity is assigned to the home location register (HLR) 10, which maintains for record purposes data such as subscriber information (e.g., electronic serial number), mobile directory number, profile information, current location, and authentication period. Authentication center (AC) 11 manages authentication information related to mobile terminal 2. The AC may be within HLR 10 and may serve more than one HLR. The interface between MSC 5 and the HLR 10 and AC 11 is shown as an IS-41 standard interface 18.

The packet data serving node (PDSN) 12 portion of PSCN 8 provides routing for packet data traffic to and from mobile terminal 2. PDSN 12 establishes, maintains, and terminates link layer sessions to mobile terminal 2 and may interface with one or more access networks 6 and one or more PSCNs 8. Authentication, authorization and accounting (AAA) 13 server provides Internet protocol authentication, authorization, and accounting functions related to packet data traffic. Home agent (HA) 14 provides authentication of mobile terminal IP registrations, redirects packet data to and from foreign agent (FA) 15, and receives provisioning information for users from AAA server 13. HA 14 may also establish, maintain, and terminate secure communications to PDSN 12 and assign a dynamic IP address. The PDSN is shown communicating with AAA server 13, HA 14, and the Internet 16 via internal IP network 17.

In the exemplary embodiment shown in FIG. 1, wireless communication network 1 operates according to known specifications for 1xEV-DO, which utilizes CDMA communication techniques. It should be understood that operation of embodiments of the present invention is similarly also possible in other types of radio, and other, communication systems. Therefore, while the following description describes operation of an embodiment of the present invention with respect to the 1xEV-DO system, operation of an embodiment of the present invention can analogously be described with respect to any of various other types of communication systems. An example of mobile terminal 2 operable in a 1xEV-DO system in accordance with an embodiment of the present invention will be described in more detailed in connection with a later figure.

Transmissions from BTS 3 to mobile terminal 2 are called forward link transmissions. Likewise, transmissions from mobile terminal 2 to BTS 3 are called reverse link transmissions. In general, the forward link transmission includes a plurality of frames defined by system specifications. In the exemplary communication system, the signals are received substantially during the reception of a frame on a plurality of channels (forward link channels), generally having signals for a pilot channel, control channels, supplemental channels, and dedicated channels. The supplemental channels include interleaved and spread data signals. The dedicated channel contains signaling information about the data transmitted on the supplemental channels.

When a connection is opened, mobile terminal 2 may be assigned a forward traffic channel, a reverse traffic channel, and reverse power control channel. Multiple connections may occur during a single session. There are generally two connection states in a 1xEV-DO system; a closed connection and an open connection.

A closed connection refers to a state in which mobile terminal 2 is not assigned any dedicated air-link resources and communications between the mobile terminal 2 and access network 6 are conducted over the access channel and the control channel. An open connection refers to a state where mobile terminal 2 can be assigned the forward traffic channel, a reverse power control channel, and a reverse traffic channel, and communication between mobile terminal 2 and access network 6 is conducted over these assigned channels as well as over the control channel.

In accordance with an embodiment, an OFDM-based air interface may be implemented to support, for example, two generalized situations. First, the air interface may support various channel conditions which a mobile terminal may experience (e.g., mobility and multipath spread). Second, the air interface may be backward compatible with existing operational standards to support legacy mobile terminals. Examples of such standards include 1xEV-DO (Rev. 0, Rev. A), NxEV-DO (Rev. B), and the like.

Regarding the first situation, one general solution is to implement multiple OFDM symbol options to accommodate various channel conditions which may be experienced by a mobile terminal. In particular, each of the OFDM symbol options may be associated with one or more channel conditions. In one aspect, OFDM symbol duration may be changed based upon the mobility, or expected mobility, of the mobile terminal. Alternatively or additionally, the length of the cyclic prefix extension (CPE) may be changed based upon the actual or anticipated multipath delay spread.

Consider, for example, indoor environments in which typical speeds of a mobile terminal are relatively low (e.g., 3 km/hour), and multipath delay spread is relatively small (e.g., less than one microsecond). In such environments, it may be desirable to use an OFDM symbol having relatively long duration (based upon the low speed of the mobile terminal) in conjunction with relatively small CPE value (based upon the typically minimal multipath delay spread). On the other hand, a relative shorter duration OFDM symbol having a relative larger CPE may be used for faster moving mobile terminals (e.g., a terminal located in a vehicle or train) in mountainous areas.

A specific embodiment utilizes a 400 chip duration OFDM symbol for mobile terminals traveling at a relatively low speed based on a 1.25 MHz system. One alternative provides for a 100 chip duration OFDM symbol for mobile terminals traveling at high-speed.

Various embodiments will be described with regard to an OFDM system that is backward compatible with NxEV-DO. However, such teachings apply equally to other systems using OFDM. If desired, an NxEV-DO interface may be defined to support a particular OFDM symbol design. Moreover, an NxEV-DO transmission slot may be designed to support one or more OFDM symbols. For example, an OFDM preamble may use 100 chip duration OFDM symbols, whereas the full data portions of the slot could use typical 400 chip duration OFDM symbols.

As a further example, an interface in a cdma2000 Rev. C (e.g., enhanced packet data air interface (E-PDAI)) may be implemented using any of several different configurations. Such configurations include supporting only legacy mobile terminals (e.g., Rev. 0, Rev. A, and Rev. B (IS-856) terminals), supporting only late model mobile terminals (e.g., Rev. C), and combinations thereof. This is a useful feature to allow smooth transition from legacy systems to newer Rev. C capable systems.

The interface may be further generalized to include other types of services such as, for example, a broadcast multicast service (BCMC), as well as various revisions thereof. The mobile terminal may also be configured to listen for broadcast, paging, and sync information over the control cycles using, for example, legacy CDM signaling mechanisms.

As previously stated, embodiments of the present invention provide for an OFDM symbol design which is backward compatible with, for example, 1xEV-DO and NxEV-DO systems. This aspect has two general sub-parts.

A first design includes an OFDM symbol having duration of over 400 chips, given bandwidths in multiples of 1.25 MHz, chip rates in multiples of 1.2288 Mcps, and a preference for radix numbers in the low end to optimize discrete Fourier transform (DFT) and inverse OFT (iDFT) operations. Note that the significance of the 400 chip duration is to facilitate the air-interface system backward compatibility with NxEV-DO and other similarly configured systems. This chip count may be modified as required to meet system needs.

A second design includes an OFDM symbol having duration less than 400 chips because of, for example, the 1xEV-DO preamble (for MAC ID or identification of the scheduled mobile terminal). Typical preamble lengths include 64, 128, 256, 512, and 1024 chips, resulting in OFDM symbol lengths of 336, 272, 144, 288, and 176, respectively. An example of this is depicted in FIG. 2, which is a table showing various preamble lengths along with corresponding symbol lengths. Accordingly, depending on the preamble length, the OFDM symbol length will vary. Likewise, as described above, the identified values may be scaled as a function of bandwidth in multiples of 1.25 MHz, for example.

FIG. 3 depicts a table which includes various OFDM designs based on a basic 1.2288 Mops clock rate. Such designs are useful to support strictly backward compatible designs with NxEV-DO. By way of non-limiting example only, various embodiments will be described with regard to OFDM symbol duration of 100, 200, and 400 chips. Other durations (e.g., 150, 250, 450, etc.) may be implemented as required or desired.

In this particular illustrated example, the following chip combinations may be implemented:
Example—1—100, 100, 100, 100;
Example—2—100, 100, 200;
Example—3—400.

As noted above, utilizing variable OFDM symbol designs is useful to support, for example, mobile terminals having varying mobility rates. For example, it may be desirable to use an OFDM symbol having relatively long duration to support mobile terminals moving at relatively low speeds. Conversely, a relative shorter duration OFDM symbol may be used for faster moving mobile terminals. CPE lengths may be similarly implemented such that larger CPE lengths are used as the multipath delay spread increases. If desired, the various OFDM symbol designs may be pre-set as a permanent setting by the network or other entity, or such designs made be adaptive to allow for changes on-the-fly (e.g., network loading, time of day, day of week, and the like). If desired, in addition to the CPE, extra samples may be introduced for windowing.

Figure 4:
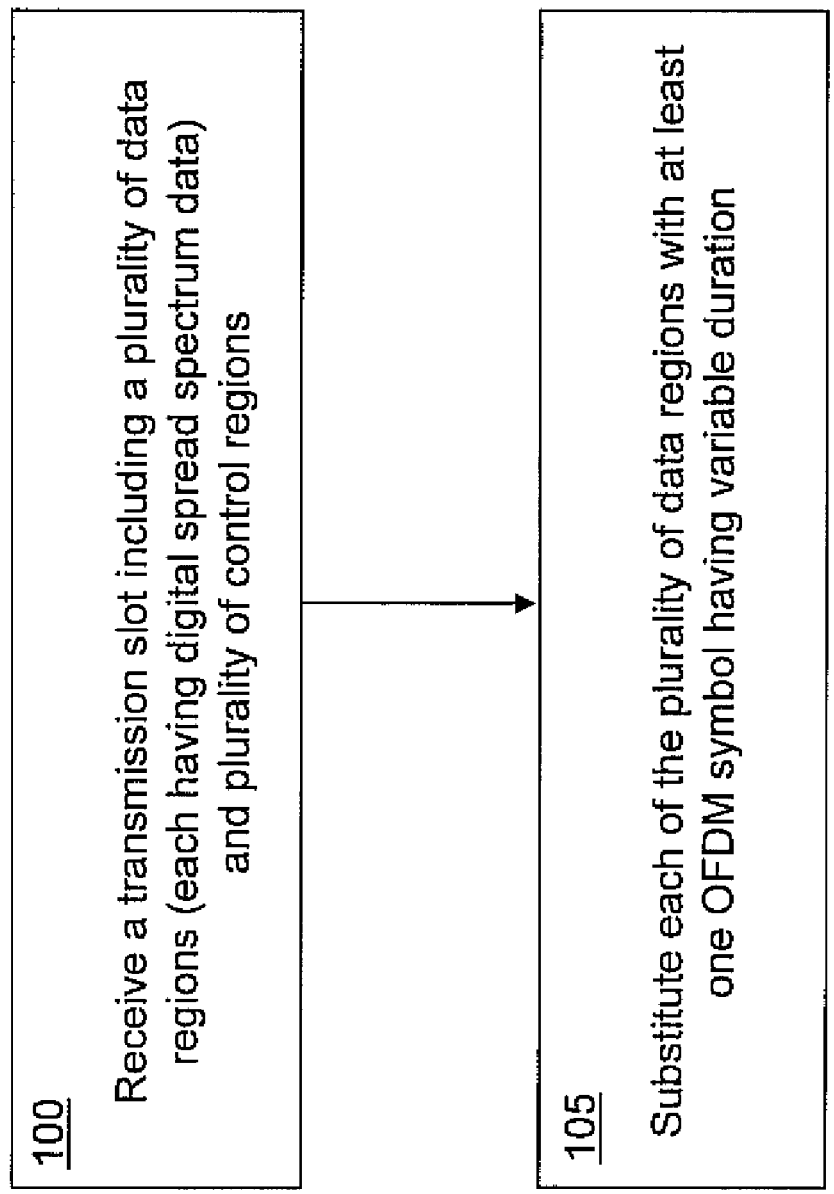
FIG. 4 is a flowchart depicting a method for generating a transmission slot in accordance with an embodiment of the present invention.

FIG. 4 is a flowchart depicting a method for generating a transmission slot in accordance with an embodiment of the present invention. At block 100, a transmission slot having a plurality of data regions and plurality of control regions is received. Each of the data regions include digital spread spectrum data. Block 105 provides substituting each of the plurality of data regions with at least one OFDM symbol having variable duration, each of the OFDM symbols including CPE.

In a specific embodiment the substituting operation of block 105 includes determining the number of OFDM symbols per data region, assigning each of the OFDM symbols to a certain number of chips of the data region, associating certain chips of the OFDM symbol to CPE, and associating certain chips of the CPE to a window.

Further examples include modifying duration of the OFDM symbol according to the relative speed between a mobile terminal receiving the transmission slot and a network entity communicating the slot. Alternatively or additionally, the length of the CPE may be modified responsive to channel delay spread experienced by a mobile terminal receiving the slot.

Figure 15:
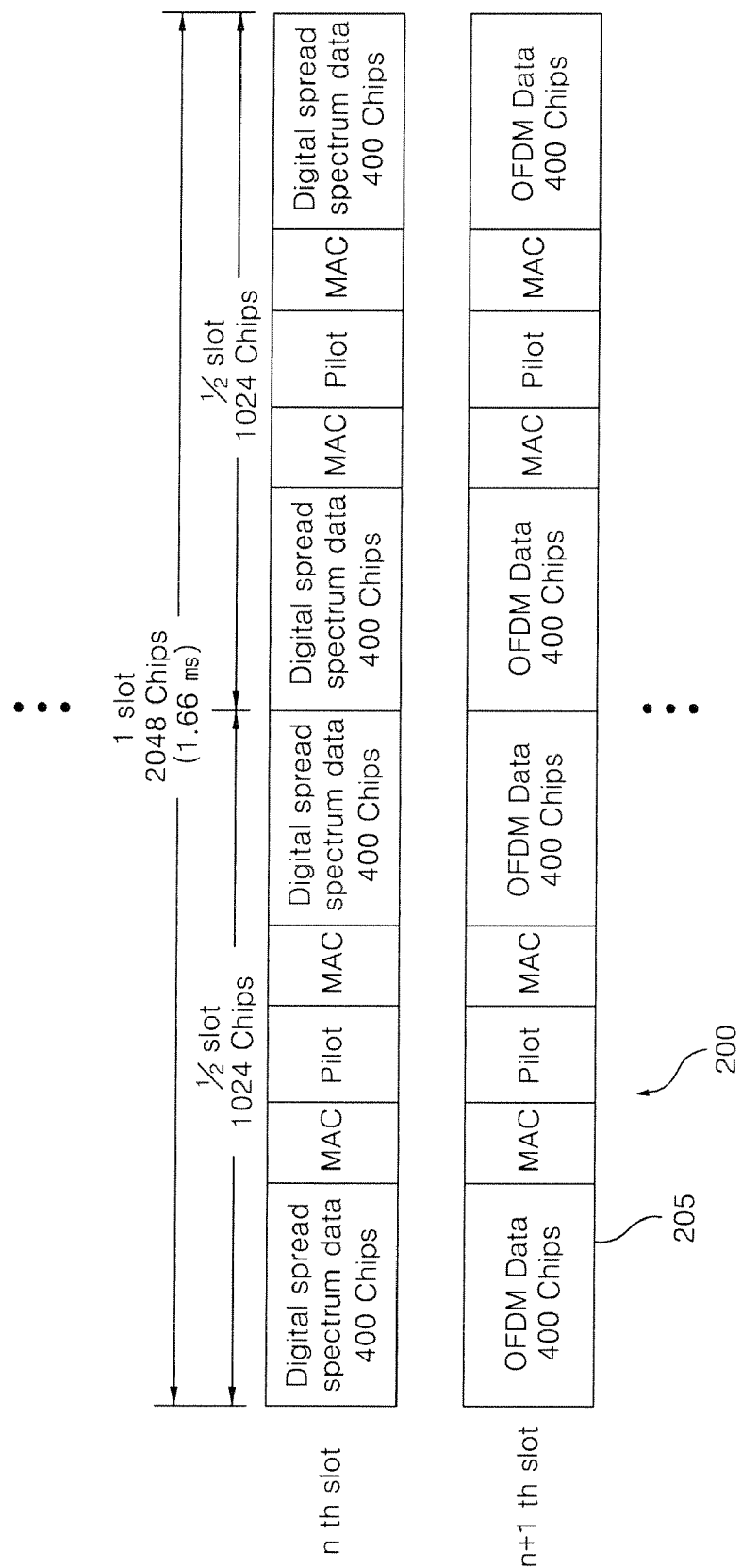
FIG. 15 depicts an interlaced transmission of slots in accordance with an embodiment of the present invention.

In an embodiment, the receiving operation of block 100 may include receiving a plurality of transmission slots. Each of the transmission slots may have the same or different number and/or type of substituted OFDM symbols. As another alternative, the substituting operation may only be performed on alternating slots (e.g. only even or odd slots) to form an interlaced transmission of slots (see, for example, FIG. 15).

FIG. 5 depicts a typical transmission slot in accordance with an embodiment of the present invention. FIG. 6 depicts various OFDM symbol designs which may be implemented in a transmission slot, such as the slot depicted in FIG. 5.

Referring first to FIG. 5, slot 200 is shown with two half-slots individually having a length of 1024 chips. Transmission slot 200 is typically implemented as a forward link slot. Each half-slot includes two OFDM data blocks 205 and control information (MAC, Pilot, MAC). Each OFDM data block 205 includes CPE and OFDM subcarriers.

Each of the four OFDM data blocks 205 of slot 200 is shown having a duration of 400 chips. In accordance with embodiments of the present invention, some or all of the data blocks 205 may be implemented with OFDM data blocks having different lengths (i.e., lengths different than 400 chips). For example, two OFDM data blocks, each having a 200 chip length, may replace some or all of the 400 chip length data blocks 205. Such an example is depicted by OFDM data blocks 210 of FIG. 6. Another alternative is to implement four OFDM data blocks which each have a 100 chip length. An example of this is depicted by OFDM data blocks 215 of FIG. 6.

FIGS. 7-13 are tables which depict various OFDM symbol designs in accordance with embodiments of the present invention. In particular, FIG. 7 depicts an OFDM symbol having a duration of 100 chips, partitioned into 96 subcarriers and a CPE length of 4. The values associated with the 1.25 MHz bandwidth are shown scaled to accommodate other bandwidths (e.g., 2.5 MHz, 3.75 MHz, 5 MHz, 10 MHz, 15 MHz, and 20 MHz). Note that these bandwidths are currently adopted in the transmission standard commonly referred to as platinum BCMCS. FIGS. 8-10 also depict OFDM symbols having a duration of 100 chips, but such symbols have CPE lengths (i.e., 10, 19, and 20, respectively) which differ from the CPE length of 4 illustrated in FIG. 7. Any of the 100 chip OFDM symbol designs of FIGS. 7-10 may be used to implement, for example, OFDM data block 215 (FIG. 6).

FIG. 11 depicts an OFDM symbol design having a duration of 200 chips, partitioned into 192 subcarriers and a CPE length of 8. Similarly, FIG. 12 depicts an OFDM symbol having a duration of 200 chips, partitioned into 180 subcarriers and a CPE length of 20. Either of the 200 chip OFDM symbol designs of FIGS. 11 and 12 may be used to implement, for example, OFDM data block 210 (FIG. 6).

FIG. 13 depicts an OFDM symbol design having a duration of 400 chips, partitioned into 384 subcarriers and a CPE length of 16. This OFDM symbol design may be used to implement, for example, OFDM data block 205 (FIGS. 5 and 6).

Figure 14:
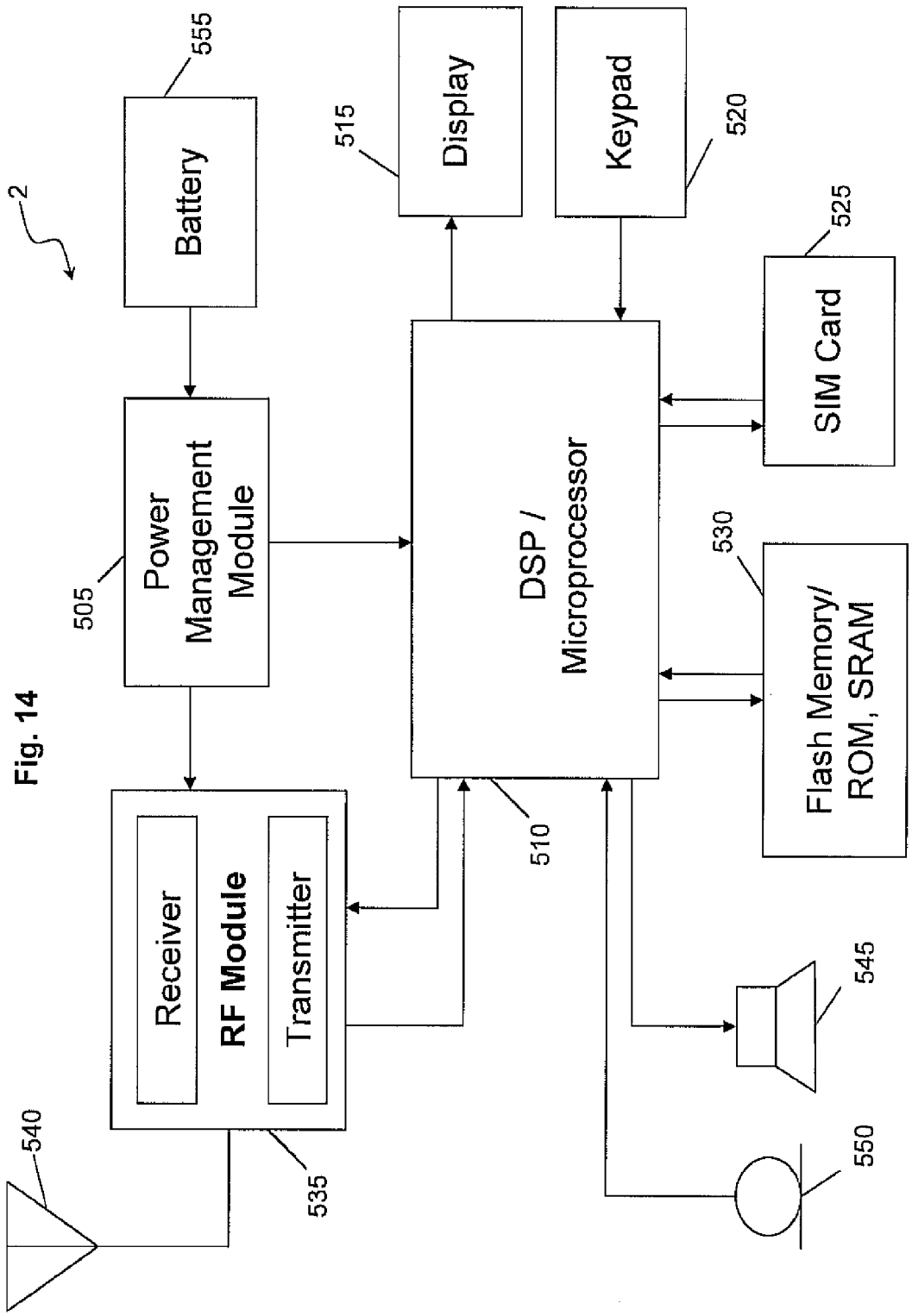
FIG. 14 is a block diagram of a mobile terminal.

FIG. 14 is a block diagram of mobile terminal 2. The mobile terminal includes processor (or digital signal processor) 510, RF module 535, power management module 505, antenna 540, battery 555, display 515, keypad 520, memory 530, subscriber identity module (SIM) card 525 (which may be optional), speaker 545, and microphone 550.

A user enters instructional information, such as a telephone number, for example, by pushing the buttons of keypad 520 or by voice activation using microphone 550. Processor 510 receives and processes the instructional information to perform the appropriate function, such as to dial the telephone number. Operational data may be retrieved from SIM card 525 or memory module 530 to perform the function. Furthermore, the processor may display the instructional and operational information on display 515 for the user's reference and convenience.

Processor 510 issues instructional information to the RF module 535 to initiate communication, for example, and to transmit radio signals comprising voice communication data. RF module 535 comprises a receiver and a transmitter to receive and transmit radio signals. Antenna 540 facilitates the transmission and reception of radio signals. Upon receiving radio signals, the RF module may forward and convert the signals to the baseband frequency for processing by processor 510. The processed signals would be transformed into audible or readable information outputted via speaker 545, for example. The processor also includes protocols and functions necessary to perform the various processes described herein with regard to cdma2000 or 1xEV-DO systems, for example.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A method for transmitting a transmission slot, the method comprising:
   generating, by a network entity, a transmission slot comprising a data region and a control region, the data region comprising an orthogonal frequency-division multiplexing (OFDM) symbol of a fixed duration, wherein the fixed duration is determined based on a preamble length;
   modifying a cyclic prefix extension (CPE) duration within the OFDM symbol based on channel delay spread experienced by a mobile terminal; and
   transmitting, by the network entity, the transmission slot to the mobile terminal.

2. The method according to claim 1, wherein the generating comprises:
   determining a number of OFDM symbols per data region;
   assigning each of the OFDM symbols to a certain number of chips of the data regions;
   associating certain chips of the OFDM symbols to the CPE; and
   associating certain chips of the CPE to a window.

3. The method according to claim 1, wherein the fixed duration of the OFDM symbol is determined further based on relative speed between the mobile terminal and the network entity.

4. The method according to claim 1, wherein the fixed duration of the OFDM symbol is determined in response to a request.

5. The method according to claim 1, wherein the fixed duration of the OFDM symbol is determined such that a sum of the fixed duration of the OFDM symbol and the preamble length is 400 chips or a multiple thereof.

6. A mobile terminal, comprising:
   an input component permitting user input;
   a display; and
   a receiver configured to receive a transmission slot comprising a data region and a control region, the data region comprising an orthogonal frequency-division multiplexing (OFDM) symbol of a fixed duration, wherein the fixed duration is determined based on a preamble length wherein a cyclic prefix extension (CPE) duration within the OFDM symbol is modified based on channel delay spread experienced by the mobile terminal.

7. The mobile terminal according to claim 6, wherein the fixed duration of the OFDM symbol is determined further based on relative speed between the mobile terminal receiving the transmission slot and a network entity communicating the transmission slot.

8. The mobile terminal according to claim 6, wherein the fixed duration of the OFDM symbol is determined such that a sum of the fixed duration of the OFDM symbol and the preamble length is 400 chips or a multiple thereof.

* * * * *

UNITED STATES PATENT AND TRADEMARK OFFICE
CERTIFICATE OF CORRECTION

PATENT NO. : 7,944,808 B2
APPLICATION NO. : 11/690724
DATED : May 17, 2011
INVENTOR(S) : Young C. Yoon et al.

Page 1 of 2

It is certified that error appears in the above-identified patent and that said Letters Patent is hereby corrected as shown below:

In the Claims

Column 8, line 29, cancel the text beginning with "1. A method for" to and ending "mobile terminal." in column 8, line 40, and insert the following claim:

-- 1. A method for transmitting a transmission slot, the method comprising: generating, by a network entity, a transmission slot comprising a data region and a control region, the data region comprising a preamble and an orthogonal frequency-division multiplexing (OFDM) symbol, wherein the preamble is a code division multiple access (CDMA) preamble used for identification of a scheduled mobile terminal and has variable lengths, wherein the OFDM symbol consists of a cyclic prefix extension (CPE) duration and a useful symbol duration, wherein a duration of the OFDM symbol is determined based on a length of the preamble;
modifying a length of the CPE duration based on a channel delay spread experienced by the mobile terminal, without changing the duration of the OFDM symbol; and transmitting, by the network entity, the transmission slot to the mobile terminal. --

Column 8, lines 49, 56, and 58, delete the word "fixed"

Column 8, line 60, cancel the text beginning with "6. A mobile terminal" to and ending "mobile terminal." in column 9, line 3, and insert the following claim:

-- 6. A mobile terminal, comprising: an input component permitting user input; a display; and a receiver configured to receive a transmission slot comprising a data region and a control region, the data region comprising a preamble and an orthogonal frequency-division multiplexing (OFDM) symbol, wherein the preamble is a code division multiple access (CDMA) preamble used for identification of a scheduled mobile terminal and has variable lengths, wherein the OFDM symbol consists of a cyclic prefix extension (CPE) duration and a useful symbol duration, wherein a duration of the OFDM symbol is determined based on a length of the preamble, wherein a length of the CPE Signed and Sealed this
Twenty-ninth Day of July, 2014

Michelle K. Lee
*Deputy Director of the United States Patent and Trademark Office*

CERTIFICATE OF CORRECTION (continued)

U.S. Pat. No. 7,944,808 B2 duration is modified based on a channel delay spread experienced by the mobile terminal, without changing the duration of the OFDM symbol. --

Column 9, line 5, and Column 10, lines 2 and 3, delete the word "fixed"